Jan. 4, 1938.  J. UNDERHILL  2,104,716
METHOD OF AND APPARATUS FOR PHOTOGRAPHICALLY RECORDING SOUND WAVES
Filed June 28, 1935  2 Sheets-Sheet 1
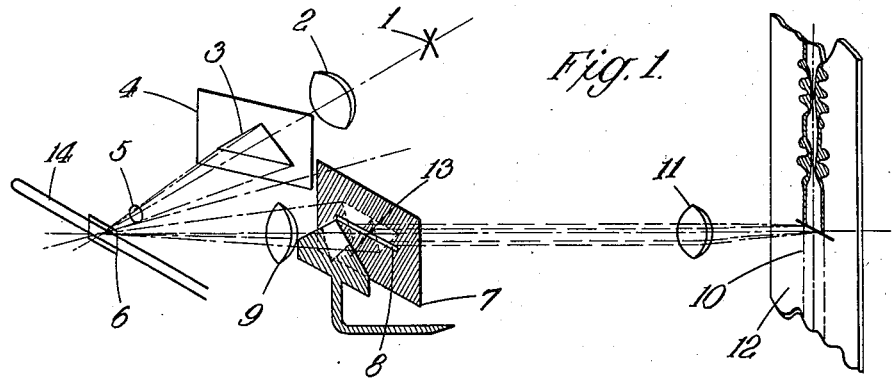
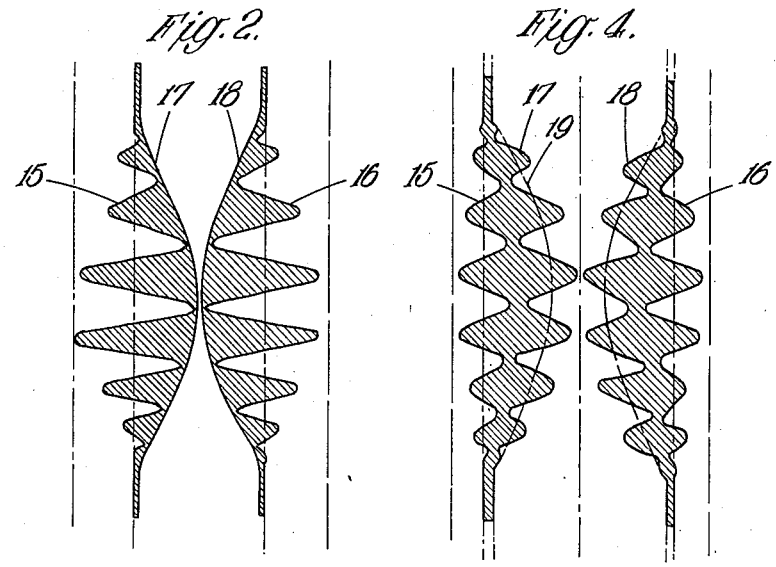 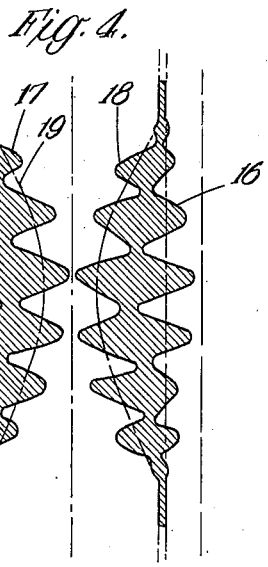
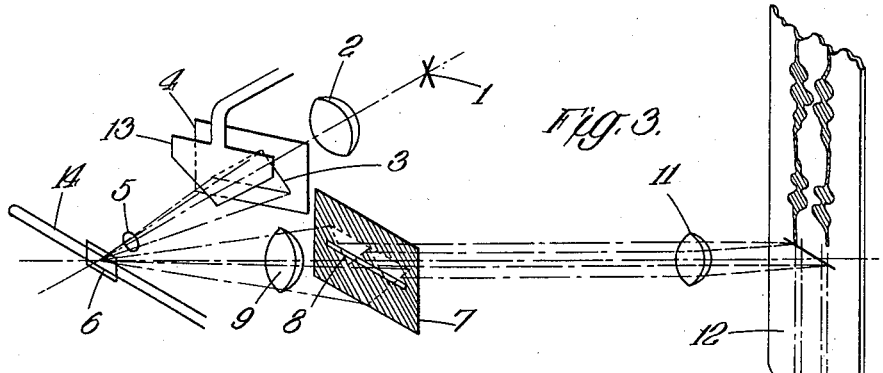
INVENTOR
JOSEPH UNDERHILL
BY *H. S. Snover*
ATTORNEY Jan. 4, 1938.  J. UNDERHILL  2,104,716
METHOD OF AND APPARATUS FOR PHOTOGRAPHICALLY RECORDING SOUND WAVES
Filed June 28, 1935  2 Sheets-Sheet 2
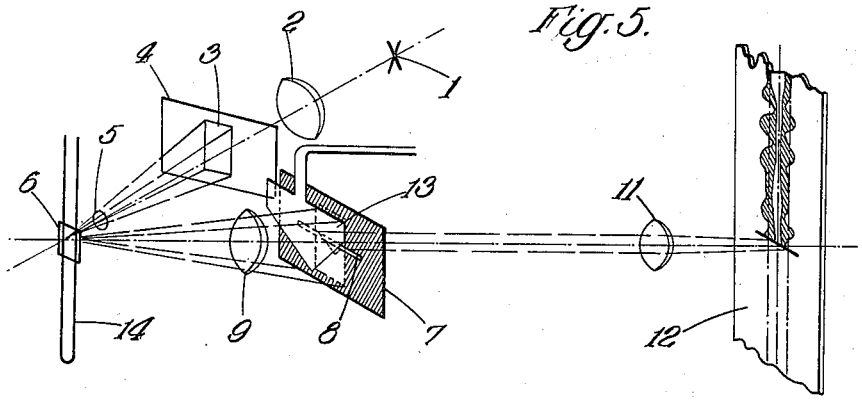
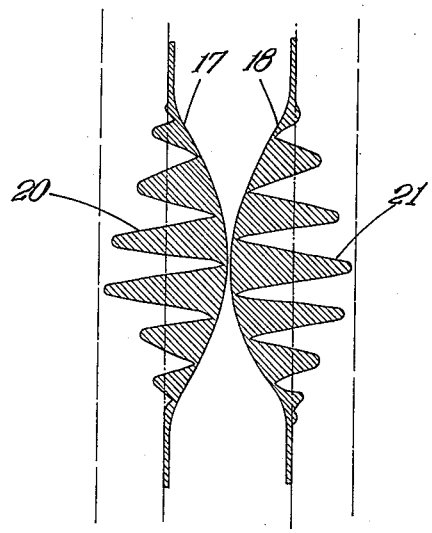
INVENTOR
JOSEPH UNDERHILL
BY
ATTORNEY Patented Jan. 4, 1938

2,104,716

UNITED STATES PATENT OFFICE 2,104,716

METHOD OF AND APPARATUS FOR PHOTOGRAPHICALLY RECORDING SOUND WAVES

Joseph Underhill, Finchley, London, England

Application June 28, 1935, Serial No. 28,869
In Great Britain July 11, 1934

11 Claims. (Cl. 179—100.3)

The present invention relates to the production of photographic sound records of the variable area type having multiple sound traces all of which constitute records of the same sounds, and has for its object to reduce what is known in the art as "ground noises" when sound is being reproduced from the record.

In the specification of British Letters Patent No. 384,742 is described a method of making photographic sound records which comprises exposing a sensitive film to a light beam, varying one side of said light beam in accordance with the wave form produced by the audio current impulses of the sound being recorded and varying the other side of said light beam by a rectified component of the audio impulses to form an envelope for the said wave form of the recorded sound. The means employed in this known method produce an asymmetrical variable area track with a single sound trace and a trace representing approximately the envelope of the sound trace adjacent thereto arranged in such a manner that the dark portion of the negative would be narrowest in parts of the film where the amplitude of modulation is smallest. This invention on the other hand, uses somewhat similar means for a like purpose in connection with multiple trace sound records.

One known means of producing a multiple trace record consists in passing a beam of light through a triangular aperture in a plate and reflecting it on to a second plate formed with a rectangular slit, the image of which is focused on the film, the reflector being vibrated back and forth in the direction of movement of the film so that the width of the beam of light passing through the slit is varied according to the sound waves to be recorded.

According to the present invention there is provided a method of recording sound in which a beam of light is projected towards a plate formed with a slit-like aperture behind which a film is moved in a direction transversely of the length of said aperture, two boundaries of said beam intersecting said aperture and being both moved substantially in accordance with the wave-form of the sounds to be recorded, whilst a shutter, or an image of a shutter, which divides into two parts the light reaching the film, is moved relatively to said aperture substantially in accordance with the envelope of the waveform of the sounds to be recorded so as to obturate the unnecessary central portions of said light.

The invention will now be described with reference to the accompanying diagrammatic drawings in which:—

Figure 1 shows apparatus for reducing ground noise in the production of a symmetrical double trace sound record, Figure 2 shows a portion of a sound record obtained with the apparatus of Figure 1, Figure 3 shows a modified form of apparatus, Figure 4 shows the kind of record obtained with the apparatus of Figure 3, Figure 5 shows apparatus for reducing ground noise in the production of a sound record containing two out-of-phase traces of the sound, and Figure 6 shows the record obtained with the apparatus of Figure 5.

Referring now to Figure 1, light from a source 1 is condensed, by a lens 2, upon a triangular aperture 3 in a screen 4. An image of the aperture 3 is formed, by a lens 5 and after reflection in a small mirror 6, upon a screen 7 formed with a slit 8, the lens 9 being a condensing lens. An image of the slit 8 is formed at 10, by a lens 11, upon a film 12 which is moved (by means which are not shown) at uniform speed in a direction perpendicular to the length of the slit 8. A triangular shutter 13 is placed close to the screen 7 in a position inverse relatively to the triangular beam of light reflected by the mirror 6, such that the light passing through the slit 8 is divided into two parts by the shutter 13.

A current corresponding substantially to the wave form of the sounds to be recorded is passed through a loop of wire 14 by which the mirror 6 is carried and which is disposed in a magnetic field of uniform strength. The mirror 6 is thus oscillated about an axis substantially perpendicular to the direction of motion of the film 12, the wave form of the oscillations corresponding with that of the sounds to be recorded. The outer sloping boundaries of the patch of light on the screen 7 therefore also oscillate up and down in accordance with the wave form of the sounds and there is produced upon the film 12 a sound record (see Figure 2) the outer boundaries 15 and 16 of which are both traces of the sounds to be recorded. The shutter 13 is also oscillated up and down but substantially in accordance with the envelope of the sounds to be recorded. This may be effected, for example, by tapping off a portion of the signals passed through the loop 14, amplifying and rectifying these currents and utilizing them to control the motion of the shutter 13.

The inner adjacent boundaries of the two parts of the beam of light passing through the slit 8 therefore move across the slit in accordance with the envelope of the sound wave form and produce corresponding traces, as shown at 17 and 18 in Figure 2, upon the film 12.

Had not the shutter 13 been interposed in the system, unmodulated light would have fallen upon that portion of the film 12 lying between the curves 17 and 18 and it is this portion of the sound record which is unnecessary and would, during reproduction, give rise to ground noise. It is assumed, of course, that reproduction is effected as usual from a positive record prepared from a negative of the kind shown in Figure 2.

It is to be understood that the apex of the shutter 13 may be reversed so that it points in the same direction as that of the beam at said shutter; furthermore although the shutter 13 is shown as intercepting the beam between the lens 9 and the screen 7 it may be placed between the mirror 6 and the lens 9 or between the screen 7 and the film 12.

In Figure 3 there is shown recording apparatus similar to that of Figure 1 with the exception that the shutter 13 is placed close to the aperture 3 instead of close to the screen 7. As before the mirror 6 and the shutter 13 are moved in accordance with the wave form and the envelope of the wave form, respectively, of the sounds to be recorded and it will be apparent that there is produced upon the film 12 (see Figure 4) a record the outer boundaries 15 and 16 of which are each representative of the wave form of the sounds and the inner adjacent boundaries 17 and 18 of which are each representative of both the wave form and the envelope of the wave form of the sounds to be recorded. In other words the inner boundary of each part of the recording beam oscillates in accordance with the wave form of the sounds about a mean line 19 which itself moves in accordance with the envelope of the sounds.

As before substantially no unmodulated, that is to say unnecessary, light falls upon the film 12 and therefore ground noise is practically eliminated.

Although in the arrangement shown in Figure 3 the shutter 13 is disposed between the screen 4 and the mirror 6 it may be placed between the light source 1 and the screen 4.

In Figure 2 the record contains two traces of the wave form of the sounds to be recorded whilst the record of Figure 4 contains four such traces. In each of these records however, the sound traces are in phase with one another so that sounds may be reproduced from any one of these records by means of the usual well-known reproducing apparatus comprising a single slit and a single light-sensitive device such as a photo-cell.

In Figure 5 there is illustrated apparatus for producing a double trace record of the kind containing two traces 180° out of phase with each other, such a record being shown in Figure 6. Referring to Figure 5 the aperture 3 is in this case rectangular and a triangular shutter 13 is disposed at the screen 7 so as to divide the beam passing through the slit 8 into two parts. The mirror 6 and shutter 13 are oscillated in the manners described previously so that the outer boundaries of the two parts of the beam passing through the slit 8 oscillate in accordance with the wave form of the sounds and at all times move transversely of the film in the same sense, whilst the inner adjacent boundaries of the two parts of the beam move in accordance with the envelope of the wave form of the sounds to be recorded.

The kind of record produced is thus as shown in Figure 6, the outer boundaries 20 and 21 of the record being representative of the wave form of the sounds but being 180° out of phase with one another, whilst the inner boundaries 17 and 18 are representative only of the envelope of the wave form of the sounds. Unnecessary light, which otherwise would have fallen upon the record between the curves 17 and 18 is eliminated by the shutter 13 as in the previous cases.

If desired, in those cases where the shutter 13 is disposed between the reflector 6 and the film 12 the effective edges of the shutter may be curvilinear, as, by choosing an appropriate curve, it is possible to compensate for non-rectilinear characteristics which occur frequently in rectifiers and thermionic valves which are employed to move the shutter.

I claim:—

1. The method of recording sound comprising the steps of directing a beam of light on a soundtrack area, dividing said beam into two similar parts, moving the inner boundaries of said parts in accordance with one characteristic of the sound to be recorded, and moving the outer boundaries of said parts in accordance with a different characteristic of the sound to be recorded.

2. The method of recording sound comprising the steps of directing a beam of light on a soundtrack area, dividing said beam into two similar parts, moving the inner boundaries of said parts in accordance with the envelope of the wave form of the sound to be recorded, and moving the outer boundaries of said parts in accordance with the wave form of the sound to be recorded.

3. The method of recording sound comprising the steps of directing a beam of light on a soundtrack area, dividing said beam into two similar parts, moving the inner boundaries of said parts in accordance with only the envelope of the wave form of the sound to be recorded, and moving the outer boundaries of said parts in accordance with the wave form of the sound to be recorded.

4. The method of recording sound comprising the steps of directing a beam of light on a soundtrack area, dividing said beam into two similar parts, moving the inner boundaries of said parts in accordance with the envelope of the wave form and the wave form of the sound to be recorded, and moving the outer boundaries of said parts in accordance with the wave form of the sound to be recorded.

5. The method of recording sound comprising the steps of directing a beam of light on a sound-track area, dividing said beam into two similar parts, moving the inner boundaries of said parts in accordance with the envelope of the wave form of the sound to be recorded, and moving the outer boundaries of said parts in accordance with the wave form of the sound to be recorded, the said movements of the outer boundaries being 180° out of phase with each other.

6. Sound recording apparatus comprising means for directing a line of light upon a sound record film, means for dividing said line of light into two similar parts, means for moving the outer ends of said parts in accordance with one characteristic of the sound to be recorded, and means for moving the inner boundaries of said parts in accordance with another characteristic of the sound to be recorded.

7. Sound recording apparatus comprising means for directing a line of light upon a sound record film, means for dividing said line of light into two similar parts, means for moving the outer ends of said parts in accordance with sound waves, and means for moving the inner ends of said parts in accordance with the envelope of the sound waves.

8. Sound recording apparatus comprising means for directing a line of light upon a sound record film, means for dividing said line of light into two similar parts, means for moving the outer ends of said parts in accordance with the wave form of the sound to be recorded, and means for moving the inner ends of said parts in accordance with both the wave form and the envelope of the wave form of the sound to be recorded.

9. Sound recording apparatus comprising means for directing a line of light upon a sound record film, means for dividing said line of light into two similar parts, means for moving the outer ends of said parts in accordance with sound waves, and means for moving the inner ends of said parts in accordance with the envelope only of the sound waves.

10. A sound record comprising two record portions symmetrically arranged about the axis of the record area, the axis of said record portions being shifted toward the axis of said area on increased modulation.

11. A photographic sound record comprising two record portions symmetrically arranged about the axis of the record area, the axes of area of each of said record portions being shifted toward the axis of said area on increased modulation.

JOSEPH UNDERHILL.